United States Patent Office 2,921,043
Patented Jan. 12, 1960

2,921,043

POLYMERIC COMPOSITION COMPRISING A CARBOXYLIC ACID CONTAINING CONJUGATED DIENE POLYMER AND AN AMINE CONTAINING CONJUGATED DIENE POLYMER

Carl A. Uraneck, Phillips, Tex., assignor to Phillips Petroleum Company, a corporation of Delaware No Drawing. Application November 9, 1953
Serial No. 391,145

8 Claims. (Cl. 260—45.5)

This invention relates to a new polymer composition from acidic and basic polymers. More specifically, this invention relates to an intermolecular neutralization product of acid and basic polymers. In one of its embodiments, this invention relates to an intermolecular neutralization product of a polymer containing a multiplicity of carboxy groups and a polymer containing a multiplicity of basic nitrogen groups.

Polymerization is well known in the art. Polymer products vary in properties from liquid to rubbery to resinous. These polymers may be homopolymers (polymerization product of a single type monomer) or copolymers of two or more monomeric materials. These polymers may be prepared by any method known to the art such as mass, emulsion, pearl, ionic, and many other methods. These polymers may be acidic such as are prepared from the acrylic acids, neutral such as are prepared from the conjugated dienes, or basic such as are prepared from the vinyl heterocyclic nitrogen compounds. The neutral monomers may be copolymerized with either the basic or acid monomers. These methods and polymers or copolymers are well known in the art and no further discussion need be made of them.

The object of my invention is to provide new polymer compositions from acidic and basic polymers by intimately blending the polymeric materials and incorporating therein various compounding ingredients if desired. The polymers are blended by any suitable mechanical mixing procedure to give a composition which comprises an intermolecular neutralization product of the two types of polymeric materials employed.

When operating in accordance with this invention any of the acidic polymers described can be blended, either alone or in admixture with each other, with any of the basic polymers and, when desired, various compounding ingredients can be incorporated into the blend. Blending can be accomplished by any mechanical mixing procedure adaptable for use with various polymers, i.e., solid, liquid, or rubbery polymers. One convenient method is to blend the polymers on a roll mill. The polymers can be employed in slab form, as crumb, or liquid polymers can be blended with solid polymers. It is not necessary that the individual polymers contain equivalent amounts of reactive groups or that the reactive components be employed in stoichiometric quantities. In fact, a polymer containing a high percentage of acidic groups can be blended in widely varying proportions with a polymer containing a low percentage of basic groups and vice versa. In many instances it is desirable that the product contain an excess of either acidic or basic groups. If desired, a third type of polymer which does not contain acidic or basic groups, i.e., a polymer which will not react with either the acidic or basic polymers, such as polybutadiene, a butadiene/styrene copolymer, or the like, can be incorporated into the blend to modify the properties of the product. In any event, the final polymer composition comprises a product of intermolecular neutralization of the acidic with the basic polymer in which are incorporated such other materials as desired.

The ratio of acidic to basic polymer employed in the compositions herein described will depend upon several factors. One of the most important factors is the ultimate use of the product. Properties of the compositions can be varied by varying the blending ratio as well as the types of polymers employed. The amount of functional group in a polymer will determine how much of a particular polymer to use as will the reactivity of the functional units. A smaller amount of a more reactive polymer might accomplish a result similar in some respects to that obtained with a larger amount of a less active polymer. In instances where the cost of one polymer is much higher than the other, the less expensive one is employed in the larger amount if the final product will have suitable properties for the use for which it is intended.

If it is desired to incorporate compounding ingredients into the polymer composition, several methods can be employed. The acidic and basic polymers can be blended first and the compounding ingredients can be incorporated into the blend or the individual polymers can be compounded and the compounded stocks blended. In other instances all or a portion of the compounding ingredients can be incorporated into one polymer and the other polymer added alone or with the remaining compounding ingredients. It is to be understood that pigments of various kinds can be added along with other compounding materials.

When operating in accordance with this invention, polymer compositions of widely varying properties can be readily obtained. Liquid, rubbery and resinous polymers can all be employed. Numerous types of polymer combinations can be used, i.e., a liquid polymer can be blended with a rubber, a rubber can be blended with a resin, rubbers and resins can be blended with each other, etc. Various pigments and other compounding ingredients can be added to the polymer compositions without difficulty and homogenous mixtures readily produced. Rubbery polymers having from low to high Mooney values, as well as those being gel free and those having a high gel content, are applicable. When the component polymers are rubbery in nature, the compositions have excellent tensile strength, in many instances higher than that of either of the component polymers.

The products of this invention are suitable for use in coating compositions, molding and casting compositions, adhesives, tire stock, specialty rubbers, wire insulation, production of films, etc.

The intermolecular reaction product of my invention is distinguished from the product obtained by the copolymerization of acidic monomers and basic monomers in that my product consists of a cross linked product wherein a reaction takes place between the acidic and basic groups in the respective polymer molecules. When acidic monomers, such as acrylic acid, are polymerized with basic monomers, such as vinylpyridine, in an anhydrous system the polymer chain contains both basic and acidic groups. For example, using stoichiometric amounts of 4-vinylpyridine polymer and acrylic acid polymer, the compound of my invention would have a structural formula such as:

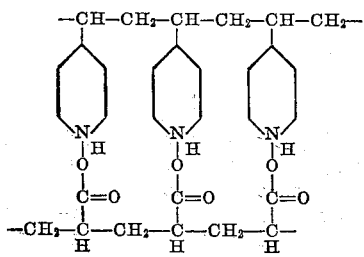

If we copolymerize the same monomeric materials we would have a compound with a structural formula such as:

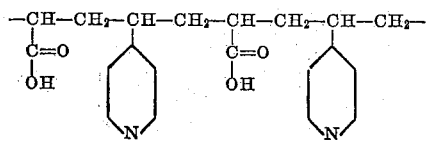

It is understood, of course, that the compounds of the two examples shown above need not be symmetrical as shown. For example when two copolymers are mixed, cross-linking will occur through intermolecular neutralization of some of the base and acid groups on the two different molecules. The amount of this neutralization will depend on such factors as the spacing of the functional groups in the two polymer molecules, the amount or number of such groups in each of the interacting molecules, the shape of the molecules, and the reactivity of the functional groups.

Acidic polymers which are applicable in the preparation of the polymer compositions of this invention are polymers containing a multiplicity of acidic groups. These acidic polymers can be prepared by direct methods such as polymerization of monomeric materials containing acidic groups by mass, emulsion, pearl, ionic, or any other polymerization methods suitable for the monomers employed. It is also within the scope of the invention to treat a polymer under suitable conditions to convert any groups present to acidic groups or to introduce acidic groups into the polymer by any method which will yield the desired product. For example, a polymer containing —CN groups can be converted to one containing carboxy groups by hydrolysis.

The acidic polymers with which this invention is concerned are homopolymers prepared from monomeric materials containing at least one acidic group per molecule or copolymers of two or more acidic monomers with each other or with one or more neutral materials copolymerizable therewith. The term copolymer is broad and includes polymers produced from two or more types of monomers. Acidic monomers which are most frequently preferred are the carboxy-containing monomers. Examples of these materials include acrylic acid, alpha- and beta alkyl-substituted derivatives in which the alkyl group contains from one to eight carbon atoms such as methacrylic acid, crotonic acid, alpha and beta ethyl-, propyl-, butyl-, amyl-, hexyl-, heptyl-, and octylacrylic acids; phenylacrylic acids, i.e., atropic and cinnamic acids; and vinylacrylic acids. Unsaturated dicarboxylic acids such as fumaric, maleic, itaconic, teraconic, and citraconic acids are also applicable. Of the carboxy-containing monomers which can be employed, acrylic and methacrylic acids are most frequently preferred. Monomers containing other acidic groups are also within the scope of the invention, such as those containing sulfonic acid (—SO$_3$H), sulfuric acid (—OSO$_3$H), boric acid (—OB(OH)$_2$), phosphoric acid (—OPO(OH)$_2$), and phosphonic acid (—PO(OH)$_2$) groups.

Materials copolymerizable with acidic monomers include conjugated dienes, styrene, alpha-methylstyrene and various other alkyl-substituted styrenes, acrylonitrile, methacrylonitrile, acrylates such as methyl acrylate, ethyl acrylate, and methyl methacrylate, vinyl chloride, vinylidene chloride, vinyl acetate, methyl vinyl ketone, methyl isopropenyl ketone, methyl vinyl ether, and the like. The comonomers frequently preferred are conjugated dienes or mixtures of conjugated dienes with each other or with other polymerizable compounds in addition to the acidic monomers. However, it is to be understood that polymers can be prepared from an acidic monomer with any acidic or neutral material or mixture of these materials copolymerizable therewith. The conjugated dienes employed are preferably those which contain from four to six, inclusive, carbon atoms per molecule, but those containing more carbon atoms per molecule, e.g., eight, can also be used. These compounds include 1,3-butadiene, isoprene, piperylene, methylpentadiene, 2,3-dimethyl-1,3-butadiene, chloroprene, and others. Furthermore, various alkoxy, such as methoxy and ethoxy, and cyano derivatives of these conjugated dienes can also be employed, i.e. 2-methoxy butadiene, and 1-cyanobutadiene.

For the production of the acidic polymers, the acidic monomer is employed in an amount in the range from 1 to 100 parts by weight per 100 parts total monomeric material. The polymers can range from liquids to elastomers to resinous materials depending upon the monomers chosen, ratio of monomers, amount and type of modifying agent, and polymerization conditions. An acidic polymer which has properties of an elastomer, can be prepared by copolymerizing an acidic monomer with a conjugated diene in certain polymerization systems. In such instances the acidic monomer is generally employed in an amount in the range between 10 and 50 parts by weight per 100 parts total monomeric material.

Basic polymers which are applicable in the preparation of the polymer compositions of this invention are polymers containing a multiplicity of basic groups. These basic polymers can be prepared by direct methods such as polymerization of monomeric materials containing basic groups by mass, emulsion, pearl, ionic, or any other polymerization methods suitable for the monomers employed. It is also within the scope of the invention to treat a polymer under suitable conditions to convert any groups present to basic groups or to introduce basic groups into the polymer by any method which will yield the desired product. For example, a polymer containing a —CN group can be converted to one containing an amino group by hydrogenation.

The basic polymers with which this invention is concerned are homopolymers prepared from monomeric materials containing at least one basic group per molecule or copolymers of these basic monomers with neutral monomer materials copolymerizable therewith. The basic monomers are nitrogen-containing materials of the primary, secondary, and tertiary amine type. Those which are frequently preferred are pyridine and quinoline derivatives containing at least one vinylidine group. The term "vinylidine" is intended to represent a

substituent where R is either hydrogen or a methyl group, i.e., the substituent is either a vinyl or an alpha-methylvinyl (isopropenyl) group. The vinylidine-substituted pyridine and quinoline compounds which are preferred are those having only one

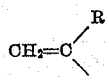

substituent and of these compounds those belonging to the pyridine series are most frequently used. Various alkyl and aryl-substituted derivatives are also applicable but it is generally preferred that the total number of carbon atoms in the nuclear-substituted alkyl and aryl groups should not be greater than 12 and most frequently these alkyl groups are methyl and/or ethyl. Examples of such compounds are 2-vinylpyridine; 3-vinylpyridine; 4-vinylpyridine; 2,4,6-trimethyl-5-vinylpyridine; 3,4,5,6-tetramethyl - 2 - vinylpyridine; 3 - ethyl - 5 - vinylpyridine; 2 - methyl - 5 - vinylpyridine; 2,6 - diethyl - 4 - vinylpyridine; 2 - isopropyl - 4 - nonyl - 5 - vinylpyridine; 2 - methyl - 5 - undecyl - 6 - vinylpyridine; 3 - dodecyl - 2,4 - divinylpyridine; 2,4 - dimethyl - 5,6 - diphenyl - 3 - vinylpyridine; 3,5 - di(alpha - methylvinyl) pyridine; similar mono and di substituted alkene, alkadiene, and alkyne pyridines; and like quinolines. Other polymerizable compounds which contain basic nitrogen groups and which are also considered applicable include aminostyrene; alkylaminostyrenes such as methylaminostyrene, 3(N-ethylamino)styrene, and 2-propyl-4-aminostyrene; dialkylaminostyrenes such as 2(N,N-dimethylamino)styrene, 3,4 - diethyl - 2 - aminostyrene, methylethylaminostyrene, dipropylaminostyrene, methylpropylaminostyrene; the corresponding amino-, alkylamino-, and dialkylamino-alpha-methylstyrenes; amino-, alkylamino-, and dialkylaminoethyl acrylates such as aminoethyl acrylate, methylaminoethyl acrylate, dimethylaminoethyl acrylate, ethylaminoethyl acrylate, diethylaminoethyl acrylate, propylaminoethyl acrylate, methylethylaminoethyl acrylate, etc., and the corresponding amino-, alkylamino-, and dialkylaminoethyl methacrylates. In general the alkyl groups will be on the amine, however, one or both can be on the styrene or acrylate group. Still other materials such as allylamine, aminobutadiene, various vinyl-substituted diazines, triazines, oxadiazines, thiadiazines, etc., are also applicable as are vinylcarbazole, vinylpyrrole, vinylmorpholine, etc. Basic monomers containing more than one vinylidine group are also applicable. Such compounds generally used are divinylpyridines and divinylquinolines. Examples of such compounds are 2,4-divinylpyridine, 2,3-divinylpyridine, 3,5-divinylpyridine, 2,4-divinyl-6-methylpyridine, 2,3-divinyl-5-ethylpyridine, 2,5-divinylquinoline, 2,5-divinyl-6-methylquinoline, 2,4-divinyl-5-ethylquinoline and the like.

The neutral monomers copolymerizable with basic monomers are the same as those hereinbefore given as being copolymerizable with acidic monomers. Of these materials, conjugated dienes or mixtures of conjugated dienes with each other, or with other neutral and basic polymerizable compounds, are most frequently employed.

For the production of the basic polymers, the basic monomer is employed in an amount in the range from 1 to 100 parts by weight per 100 parts total monomeric material. The polymers can range from liquids to elastomers to resinous materials depending upon the monomers chosen, ratio of monomers, amount and type of modifying agent and polymerization conditions. A basic polymer which has properties of an elastomer, can be prepared by copolymerizing a basic monomer with a conjugated diene. In such instances the basic monomer is generally employed in an amount in the range between 10 and 50 parts by weight per 100 parts total monomeric material.

The compounds of our invention are not amphoteric as is the copolymer of acidic and basic monomers. The solubility of our product is dependent upon the predominance of basic or acid functional groups and upon the amount of neutral component present such as styrene and butadiene.

The advantages of my invention can best be described by the following examples which are given for the purpose of illustration only and they are not intended to limit the scope of my invention in any manner. For example, any of the polymers or copolymers containing a multiplicity of acid groups and any of the polymers or copolymers containing a multiplicity of basic groups as disclosed may be substituted for the polymers used in these examples. The particular polymers used give rubbery products which are superior in many ways, as shown by the example, to those produced by conventional polymerization or copolymerization.

EXAMPLE I

Butadiene/acrylic acid rubbery copolymers were blended on the mill with butadiene/2-methyl-5-vinylpyridine rubbery copolymers in 50/50 weight proportions. These two types of copolymers were prepared by copolymerizing butadiene with either acrylic acid or 2-methyl-5-vinylpyridine in aqueous emulsion at 41° F. using monomer weight ratios of 95/5, 90/10, 80/20 and 70/30. Mooney values (ML-4) of the various copolymers were as follows:

| Butadiene/Acrylic Acid Copolymers | | Butadiene/2-Methyl-5-Vinylpyridine Copolymers | |
|---|---|---|---|
| Monomer Ratio By Wt. | ML-4 | Monomer Ratio By Wt. | ML-4 |
| 95/5 | 52 | 95/5 | 39 |
| 90/10 | 25 | 90/10 | 79 |
| 80/20 | 30 | 80/20 | 47 |
| 70/30 | 34 | 70/30 | 54 |

In each case polymers prepared using the same monomer ratios were blended with each other. The blends were compounded in accordance with the following recipe:

| | Parts by weight |
|---|---|
| Rubber (copolymer blend) | 100 |
| Carbon black (Philblack O) | 0, 30, 50 |
| Zinc oxide | 0.5 |
| Stearic acid | 1.0 |
| Flexamine [1] | 1.0 |
| Circosol-Paraflux blend [2] | 5.0 |
| Sulfur | 1.75 |
| Santocure [3] | Variable |

[1] A physical mixture containing 65 percent of a complex diarylamine-ketone reaction product and 35 percent of N,N'-diphenyl-p-phenylenediamine.
[2] A blend of equal parts Circosol-2XH with Paraflux. Circosol-2XH: A petroleum hydrocarbon softener, containing hydrocarbons of high molecular weight, in the form of heavy, viscous, transparent, pale green, odorless liquid of low viscosity; sp. gr., 0.940; Saybolt Universal viscosity at 100° F., about 2,000 seconds. Paraflux: Saturated polymerized hydrocarbon.
[3] N-cyclohexyl-2-benzothiazolesulfenamide.

The stocks were milled, cured 30 minutes at 307° F., and physical properties determined. Butadiene/acrylic acid and butadiene/2-methyl-5-vinylpyridine copolymers prepared using 80/20 and 70/30 monomer ratios were compounded separately using the compounding formula given above with 50 parts of carbon black and physical properties were determined on these stocks. Data on the various runs are given in Table I. Data are also included for a 75/25 butadiene/styrene rubber, having a Mooney value of approximately 55, compounded in the manner described above with 50 parts of carbon black,

Table 1

| Elastomer | Black, p.h.r.[1] | Santocure, p.h.r.[1] | 80° F. | | | 200° F. Maximum Tensile, p.s.i. | ΔT, °F. | Resilience, Percent | Flex Life, M[2] | Shore Hardness | Comp. Set, 212° F. | 70/30 Isooctane/Toluene[3] | | Compounded MS, 1½ at 212° F. |
|---|---|---|---|---|---|---|---|---|---|---|---|---|---|---|
| | | | 300% Mod., p.s.i. | Tensile, p.s.i. | Elong., Percent | | | | | | | Swelled, Percent | Extracted, Percent | |
| 50/50 Blend of 95/5 Copolymers | | 1 | 85 | 375 | 590 | | | 66.1 | 2.8 | 31 | 22.6 | 343.5 | 13.0 | 24.5 |
| | 30 | 1 | 610 | 1,850 | 520 | 600 | 86.6 | 63.4 | 5.4 | 47.5 | 20.0 | 236.8 | 10.2 | 34.5 |
| | 50 | 1 | 1,450 | 2,115 | 380 | 700 | 95.8 | 58.4 | 2.2 | 59 | 16.3 | 192.8 | 8.5 | 47.5 |
| 50/50 Blend of 90/10 Copolymers | | 0.8 | | 365 | 700 | | | 93.2 | 64.9 | 1.9 | 33.5 | 22.0 | 255.7 | 13.8 | 22 |
| | 30 | 0.8 | 610 | 2,290 | 610 | 5,500 | 91.5 | 60.3 | 13.1 | 47.5 | 19.2 | 183.5 | 10.3 | 32 |
| | 50 | 0.8 | 1,500 | 2,800 | 460 | 670 | 98.6 | 56.0 | 5.0 | 58 | 18.8 | 156.8 | 9.4 | 50.5 |
| 80/20 Butadiene/Acrylic Acid Copolymer | 50 | 0.9 | 2,340 | 2,725 | 340 | 1,400 | 109.4 | 40.1 | 11.6 | 74 | 19.5 | 70.0 | 5.8 | 45.5 |
| Blend of 80/20 Copolymers | | 0.8 | | | | | 86.6 | 59.1 | 3.7 | 38.5 | 29.2 | 143.9 | 10.9 | |
| | 30 | 0.8 | 1,025 | 3,140 | 520 | 1,150 | 84.8 | 53.7 | 23.9 | 57.5 | 25.1 | 111.4 | 8.4 | 38 |
| | 50 | 0.8 | 2,285 | 3,490 | 415 | 1,700 | 91.8 | 48.3 | 11.9 | 69.5 | 24.2 | 94.2 | 7.6 | 51 |
| 80/20 Butadiene/2-Methyl-5-Vinylpyridine Copolymer | 50 | 0.7 | 1,440 | 3,475 | 515 | 1,650 | 77.1 | 62.0 | 12.9 | 56.5 | 15.1 | 124.9 | 6.8 | 39 |
| 70/30 Butadiene/Acrylic Acid Copolymer | 50 | 0.6 | [3]3,660 | [3]4,035 | [3]330 | 2,200 | 99.7 | 17.0 | 101.2 | 81.5 | 17.9 | 33.9 | 3.9 | 53.5 |
| Blend of 70/30 Copolymers | | 0.65 | | | | | 59.9 | 46.5 | 0.6 | 49.5 | 26.5 | 71.1 | 8.5 | |
| | 30 | 0.65 | 1,900 | 3,775 | 435 | 1,700 | 71.9 | 36.9 | 38.8 | 66.5 | 24.5 | 59.2 | 6.4 | 57.5 |
| | 50 | 0.65 | 3,775 | 4,775 | 390 | 2,920 | 84.4 | 32.0 | 36.5 | 78 | 25.0 | 52.6 | 5.3 | 68 |
| 70/30 Butadiene/2-Methyl-5-Vinylpyridine Copolymer | 50 | 0.7 | 1,825 | 3,990 | 490 | 1,900 | 68.3 | 66.7 | 54.5 | 57.5 | 19.8 | 174.6 | 5.8 | 48.5 |
| 75/25 Butadiene/Styrene Copolymer | 50 | 1.0 | 1,625 | 3,615 | 510 | 1,400 | 64.9 | 62.8 | 13.2 | 56 | 21.2 | 171.5 | 9.2 | 38.5 |

[1] Parts per 100 parts rubber.
[2] Thousands of flexures to failure.
[3] 45 minutes' cure time.

EXAMPLE II

A 90/10 butadiene/acrylic acid rubbery copolymer was blended on the mill with an 80/20 butadiene/2-methyl-5-vinylpyridine rubbery copolymer using the copolymers in 50/50 weight proportions. The blend was compounded as was each of the copolymers and also a 75/25 butadiene/styrene rubber. The several compounding recipes are given below.

| | Parts by Weight | | | |
|---|---|---|---|---|
| | Butadiene/ 2-Methyl-5-Vinyl-pyridine | Butadiene/ Acrylic Acid | Blend | Butadiene/ Styrene |
| Elastomer | 100 | 100 | 100 | 100 |
| Carbon black (Philblack O) | 50 | 50 | 50 | 50 |
| Zinc Oxide | 1 | 1 | 1 | 1 |
| Stearic acid | 1 | 1 | 1 | 1 |
| Flexamine[1] | 1 | 1 | 1 | 1 |
| Sulfur | 1.75 | 1.75 | 1.75 | 1.75 |
| Santocure[1] | 0.7 | 0.8 | 0.75 | 1.0 |
| Circosol-Paraflux Blend[1] | .5 | .5 | .5 | 5 |

[1] As in Example I.

The stocks were milled, cured 30 minutes at 307° F., and physical properties determined. The following results were obtained:

| Elastomer | 80° F. | | | 200° F.[1] Tensile, p.s.i. | ΔT, °F. | Resilience, Percent | Compression Set, Percent |
|---|---|---|---|---|---|---|---|
| | 300% Modulus, p.s.i. | Tensile, p.s.i. | Elongation, Percent | | | | |
| Butadiene/2-methyl-5-vinyl-pyridine copolymer | 1,475 | 3,360 | 515 | 1,780 | 75.0 | 63.7 | 14.6 |
| Butadiene/acrylic acid copolymer | 2,520 | 2,940 | 345 | 1,400 | 81.4 | 63.2 | 14.2 |
| Blend | 2,550 | 3,660 | 410 | 2,100 | 83.4 | 59.5 | 12.2 |
| Butadiene/styrene rubber | 1,075 | 2,590 | 550 | 1,490 | 87.5 | 61.0 | 26.1 |

OVEN AGED 24 HOURS AT 212° F.

| | | | | | | | |
|---|---|---|---|---|---|---|---|
| Butadiene/2-methyl-5-vinyl-pyridine copolymer | | 2,900 | 400 | | | | |
| Butadiene/acrylic acid copolymer | | 2,660 | 230 | | | | |
| Blend | | 3,575 | 290 | | | | |
| Butadiene/styrene rubber | | 2,810 | 360 | | | | |

[1] Cured 45 minutes.

EXAMPLE III

50/50 blends of a 90/10 butadiene/acrylic acid copolymer (ML-4 62.5) and a 95/5 butadiene/acrylic acid copolymer (ML-4 37.5) with an 80/20 butadiene/2-vinylpyridine copolymer (ML-4 52) were prepared by mill mixing and the blends were then compounded in accordance with the following formula:

| | Parts by weight |
|---|---|
| Copolymer blend | 100 |
| Carbon black (Philblack O) | 50 |
| Zinc oxide | 3 |
| Sulfur | 1.75 |
| Stearic acid | 2 |
| Circosol-Paraflux blend[1] | 5 |
| Flexamine[1] | 1 |
| Santocure[1] | 1 |

[1] As in Example I.

The stocks were milled, cured 30 minutes at 307° F., and physical properties determined. The following results were obtained:

| Blend of Butadiene/2-Vinyl-pyridine Polymer With— | Raw ML-4 | Compound MS 1½ at 212° F. | 80° F. | | 200° F. Tensile, p.s.i. | ΔT, ° F. | Resilience, Percent | Shore Hardness | Comp. Set, Percent |
|---|---|---|---|---|---|---|---|---|---|
| | | | Tensile, p.s.i. | Elong., Percent | | | | | |
| 95/5 Butadiene/acrylic acid copolymer | 54 | 47.5 | 3,430 | 325 | 1,880 | 83.8 | 62.9 | 75 | 12.7 |
| 90/10 Butadiene/acrylic acid copolymer | 79 | 59.5 | 4,100 | 305 | 2,040 | 87.8 | 57.1 | 80 | 10.2 |
| OVEN AGED 24 HOURS AT 212° F. | | | | | | | | | |
| 95/5 Butadiene/acrylic acid copolymer | | | 3,100 | 245 | | 69.9 | 67.9 | 79 | |
| 90/10 Butadiene/acrylic acid copolymer | | | 2,790 | 185 | | 87.8 | 61.9 | 83 | |

EXAMPLE IV

A 50/50 blend of a 90/10 butadiene/acrylic acid copolymer (ML-4 120) and an 80/20 butadiene/2-vinylpyridine copolymer (ML-4 100) was prepared on the mill and the resulting material compounded in accordance with the following recipe:

| | Parts by weight |
|---|---|
| Copolymer blend | 100 |
| Carbon black (Philblack O) | 50 |
| Zinc oxide | 0.1, 0.5, 1.0, 2.0, 3.0, 5.0 |
| Sulfur | 1.75 |
| Stearic acid | 1 |
| Circosol-Paraflux blend | 5 |
| Flexamine [1] | 1 |
| Santocure | 1 |

[1] As in Example I.

The stocks were milled, cured 30 minutes at 307° F., and physical properties determined. The following results were obtained:

butadiene/acrylic acid copolymer employed was a blend prepared from 589 grams of a 48 ML-4 product with 50 grams of a 53.5 ML-4 product. Two butadiene/2-vinylpyridine polymers were blended, 450 grams of a 38.6 ML-4 product with 940 grams of a 49.3 ML-4 product, and a sample of this blend employed. The blend thus prepared was compounded using the following recipe:

| | Parts by weight |
|---|---|
| Copolymer blend | 100 |
| Carbon black (Philblack O) | 30 |
| Zinc oxide | 1 |
| Paraflux [1] | 5 |
| Stearic acid | 2 |
| Staybelite resin [2] | 2.5 |
| Sulfur | 2.5 |
| Santocure [1] | 1 |
| A-32 [3] | 0.2 |

[1] As in Example I.
[2] Hydrogenated rosin.
[3] Reaction product of butyraldehyde and butylidene aniline.

The butadiene/acrylic acid and butadiene/2-vinylpyridine copolymers were each compounded using the same

| ZnO | 80° F. | | 200° F. Tensile, p.s.i. | ΔT, ° F. | Resilience, Percent | Comp. Set, Percent | Shore Hardness |
|---|---|---|---|---|---|---|---|
| | Tensile, p.s.i. | Elongation, Percent | | | | | |
| 0 | 3,030 | 370 | 1,140 | 76.3 | 63.0 | 19.7 | 64 |
| 0.5 | 4,000 | 340 | 1,320 | 70.3 | 63.4 | 14.8 | 69 |
| 1.0 | 3,950 | 300 | 2,060 | 74.0 | 61.3 | 12.9 | 74 |
| 2.0 | 3,960 | 240 | 1,580 | 81.4 | 57.0 | 9.8 | 80 |
| 3.0 | 4,000 | 230 | 1,920 | 81.1 | 55.6 | 8.8 | 83 |
| 5.0 | 4,000 | 220 | 1,640 | 86.0 | 53.9 | 9.2 | 84 |
| OVEN AGED 24 HOURS AT 212° F. | | | | | | | |
| 0 | 2,530 | 225 | | 61.9 | 67.3 | | |
| 0.5 | 3,230 | 230 | | 67.2 | 63.9 | | |
| 1.0 | 3,160 | 195 | | 71.3 | 61.8 | | |
| 2.0 | 3,200 | 200 | | 78.0 | 58.3 | | |
| 3.0 | 4,000 | 180 | | 83.8 | 56.2 | | |
| 5.0 | 3,300 | 160 | | 88.4 | 56.0 | | |

EXAMPLE V

A 50/50 copolymer blend was prepared by mixing a 90/10 butadiene/acrylic acid copolymer with an 80/20 butadiene/2-vinylpyridine copolymer on the mill. The carcass formulation except that 3 parts zinc oxide was used for the vinylpyridine copolymer. The stocks were milled, cured 30 minutes at 307° F. and physical properties determined. Results were as follows:

| Elastomer | 80° F. | | | 200° F. Tensile, p.s.i. | ΔT, ° F. | Resilience, Percent | Shore Hardness | Compression Set, Percent |
|---|---|---|---|---|---|---|---|---|
| | 300 % Modulus, p.s.i. | Tensile, p.s.i. | Elongation, Percent | | | | | |
| Bd/Vp [1] | 1,580 | 3,220 | 475 | 1,140 | 43.9 | 76.8 | 57 | 16.9 |
| Blend | 2,100 | 4,290 | 460 | 1,020 | 57.5 | 63.7 | 65 | 14.0 |
| Bd/AA [2] | 1,950 | 2,860 | 400 | 1,000 | 57.8 | 63.9 | 60 | 11.2 |
| OVEN AGED 24 HOURS AT 212° F. | | | | | | | | |
| Bd/Vp [1] | 2,550 | 2,780 | 320 | | 38.1 | 79.7 | 61 | |
| Blend | | 2,280 | 200 | | 58.1 | 65.2 | 70 | |
| Bd/AA [2] | | 1,940 | 180 | | 53.7 | 67.2 | 66 | |

[1] 80/20 butadiene/2-vinylpyridine copolymer.
[2] 90/10 butadiene/acrylic acid copolymer.

EXAMPLE VI

A 90/10 butadiene/acrylic acid rubbery copolymer and an 80/20 butadiene/2-methyl-5-vinylpyridine rubbery copolymer were employed in the production of a piled stock using the individual copolymers in 50/50 weight proportions. Each copolymer was compounded using the recipes given in Example II. Slabs were fabricated by plying thin layers of the two stocks alternating the rubbers for each ply. The stocks were cured 30 minutes at 307° F. and physical properties determined. Results are shown below:

Stress-strain properties at 80° F.:
    300% modulus, p.s.i. _____ 2150
    Tensile, p.s.i. _____ 2555
    Elongation, percent _____ 350
Stress-strain properties at 200° F. tensile, p.s.i.
    (cured 45 minutes) _____ 1050
ΔT, ° F. _____ 78.0
Resilience, percent _____ 63.5
Compression set _____ 14.9

I have used butadiene/acrylic acid copolymer as my acid polymer and butadiene/vinylpyridine or (MVP) as my basic polymer in order to illustrate my invention. My invention is not limited to these polymeric materials, but any of the acidic and basic polymeric materials as hereinbefore indicated will be suitable in my invention.

I claim:

1. A polymeric composition of matter comprising an intermolecular neutralization product of a polymer prepared by copolymerizing 50 to 90 weight percent conjugated diene of 4 to 8 carbon atoms with 50 to 10 weight percent of a carboxylic acid containing a polymerizable ethylenic unsaturation and a polymer prepared by copolymerizing 50 to 90 weight percent conjugated diene of 4 to 8 carbon atoms with 50 to 10 weight percent of an amine containing a vinylidene group attached to a carbon atom, said amine being selected from the group consisting of primary, secondary and tertiary amines.

2. The composition of claim 1 wherein the carboxylic acid is selected from the group consisting of acrylic acid and alpha and beta alkyl substituted derivatives of acrylic acid in which the alkyl groups contain from 1 to 8 carbon atoms.

3. The composition of claim 2 wherein the conjugated diene is 1,3-butadiene.

4. The composition of matter of claim 3 wherein the carboxylic acid is acrylic acid and the amine is 2-methyl-5-vinylpyridine.

5. The composition of matter of claim 3 wherein the carboxylic acid is acrylic acid and the amine is 2-vinylpyridine.

6. The composition of matter of claim 3 wherein the carboxylic acid is methacrylic acid and the amine is 2-methyl-5-vinylpyridine.

7. The composition of matter of claim 3 wherein the carboxylic acid is methacrylic acid and the amine is 2-vinylpyridine.

8. A polymeric composition of matter comprising the intermolecular neutralization product of a polymer containing carboxy groups in the polymer and a polymer containing basic groups in the polymer, said basic groups being selected from the group consisting of pyridyl, aryl-substituted pyridyl and alkyl-substituted pyridyl groups wherein both of said polymers are prepared by copolymerizing monomers containing the respective said functional groups with 50 to 90 weight parts per 100 parts total monomers of a conjugated diene.

References Cited in the file of this patent

UNITED STATES PATENTS

| | | |
|---|---|---|
| 2,527,863 | Webb _____ | Oct. 31, 1950 |
| 2,561,215 | Mighton _____ | July 17, 1951 |
| 2,586,770 | Alm _____ | Feb. 26, 1952 |
| 2,586,883 | Stroh _____ | Feb. 26, 1952 |
| 2,592,107 | Azorloza _____ | Apr. 8, 1952 |
| 2,593,414 | Crouch _____ | Apr. 22, 1952 |
| 2,647,094 | Hahn _____ | July 28, 1953 |
| 2,807,597 | Sonnenfeld et al. _____ | Sept. 24, 1957 |